(12) United States Patent
Smith

(10) Patent No.: US 9,554,291 B2
(45) Date of Patent: Jan. 24, 2017

(54) GENERATION OF RF STIMULUS SIGNAL USING DC MODULATING SIGNAL

(71) Applicant: Advantest Corporation, Tokyo (JP)

(72) Inventor: Jason Smith, San Diego, CA (US)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 14/614,327

(22) Filed: Feb. 4, 2015

(65) Prior Publication Data

US 2016/0227421 A1 Aug. 4, 2016

(51) Int. Cl.
H04W 24/06 (2009.01)

(52) U.S. Cl.
CPC .................................... *H04W 24/06* (2013.01)

(58) Field of Classification Search
CPC .............................. H04W 24/06; H04W 24/00
USPC ...................................................... 455/67.14
See application file for complete search history.

(56) References Cited

U.S. PATENT DOCUMENTS

| 7,003,063 | B2 * | 2/2006 | Mill | H04L 7/041 375/354 |
| 7,672,669 | B2 * | 3/2010 | Alexander | H04W 24/06 455/423 |
| 7,683,842 | B1 * | 3/2010 | Engel | H04K 3/822 342/170 |
| 8,213,927 | B2 * | 7/2012 | Cheng | H04B 17/21 455/423 |
| 8,533,136 | B1 * | 9/2013 | Xu | G06F 17/5036 706/16 |
| 8,559,885 | B2 * | 10/2013 | Seelenfreund | H04W 24/06 324/601 |
| 8,983,395 | B2 * | 3/2015 | Luong | H04W 24/06 455/67.11 |
| 9,118,753 | B2 * | 8/2015 | Harrison | H04M 1/24 |
| 9,121,881 | B2 * | 9/2015 | Muecke | G01R 31/3191 |
| 2002/0075974 | A1 * | 6/2002 | Mill | H04L 7/041 375/340 |
| 2008/0020746 | A1 * | 1/2008 | Alexandar | H04W 24/06 455/423 |
| 2010/0227607 | A1 * | 9/2010 | Lorion | H04B 17/0085 455/425 |
| 2010/0228515 | A1 * | 9/2010 | Srinivasan | H04L 1/24 702/124 |
| 2011/0053518 | A1 * | 3/2011 | Shindo | H04B 17/0085 455/67.14 |
| 2011/0070882 | A1 * | 3/2011 | Cheng | H04W 52/367 455/424 |
| 2012/0264377 | A1 * | 10/2012 | Seelenfreund | H04W 24/06 455/67.11 |
| 2013/0149972 | A1 * | 6/2013 | Luong | H04W 24/06 455/67.14 |

(Continued)

*Primary Examiner* — Hai V Nguyen

(57) ABSTRACT

Systems and methods of generating an RF stimulus signal with different power levels for IC testing. A DC modulating signal is used to power modulate a radio frequency (RF) carrier signal and thereby generate an RF stimulus signal at varying power levels. The DC modulating signal includes a sequence of DC waveforms at different voltage levels. A DC voltage transition in the modulating signal instantaneously triggers the transition of an output power in the RF stimulus signal. Reference waveforms that can cause a known response pattern in a DUT may be added at the beginning of the modulating signal for data calibration purposes.

20 Claims, 5 Drawing Sheets

(56) References Cited

U.S. PATENT DOCUMENTS

2013/0326089 A1* 12/2013 Harrison ................. H04M 1/24
710/5

* cited by examiner

GENERATION OF RF STIMULUS SIGNAL USING DC MODULATING SIGNAL

TECHNICAL FIELD

The present disclosure relates generally to the field of semiconductor device testing, and, more specifically, to the field of RF amplifier testing.

BACKGROUND

In semiconductor manufacturing, automatic test equipment (ATE) is used to test integrated circuit (IC) devices, e.g., to characterize electrical properties, detect abnormalities, and evaluate product quality. During testing operations, stimulus signals are generated and provided to devices under test (DUTs) and the resultant output signals generated from the DUTs are evaluated against the expectation values.

A variety of standard IC tests require using a continuous wave (CW) RF signal having different power levels as the stimulus signal to a DUT, such as the gain and linearity tests for RF amplifies. Conventionally, varying the output level of an RF signal generator is accomplished by changing the internal state of the generator. In a typical RF generator, an automatic level control (ALC) feedback loop, in conjunction with an amplitude modulator and a variable attenuator, are used to ensure delivery of accurate signal levels to a DUT.

However, the utilization of the feedback loop inevitably and disadvantageously prolongs the transition time from one RF output level to another in terms of power, frequency, or amplitude, etc. For instance, in a linearity test on an RF power amplifier, it requires a power sweep across a given range. Commonly, the time it takes to switch an RF output in power or frequency is around 1 ms, and the time it takes to perform a test at one power level is around 20 µs. So, to measure over a 20 dBm range, the theoretical best time one can achieve is 20×(1.0+0.02) ms=20.4 ms. This demonstrates that the test throughput is predominantly limited by the transition times for switching of RF output levels, which leads to undesired increases in device manufacturing time and cost.

SUMMARY OF THE INVENTION

Therefore, it would be advantageous to provide a mechanism of generating RF stimulus signals for integrated circuit (IC) testing with improved testing time efficiency and testing throughput.

Embodiments of the present disclosure utilize a sequence of direct current (DC) waveforms as a modulating signal to modulate a radio frequency (RF) carrier signal and thereby generate an RF stimulus signal at varying power levels. The modulating signal includes DC waveforms at different voltage levels. A DC voltage transition in the modulating signal instantaneously triggers the transition of output power in the RF stimulus signal. The RF stimulus signal is then provided to the input of a device under test (DUT) and the DUT output signal is evaluated against expected response values. In some embodiments, the DC-modulating signal is supplied from an arbitrary waveform generator (AWG) according to a preloaded DC waveform sequence and fed to a modulator to modulate an RF carrier signal. The DC waveform sequence is determined based on the stimulus signal power requirements and the maximum voltage of the digital-analog-converters (DACs) in the modulator. Reference waveforms that can cause a known response pattern in a DUT may be added at the beginning of the modulating signal to facilitate identifying the start of a test in the test result.

Because the power modulation is performed without involving a feedback process, an IC test according to the present disclosure effectively eliminates the settling time required by an automatic level control (ALC) process as used in the prior art. Thereby, a transient time for switching from one RF output level to another is advantageously diminished. Consequently, the testing efficiency as well as the test throughput can be significantly enhanced.

According to an embodiment of the present disclosure, a method of testing an electronic device is described and comprises generating a DC modulating signal and generating an RF carrier signal at a constant power level. The DC modulating signal includes a sequence of DC waveforms at a plurality of DC voltages. The carrier signal is power modulated using the modulating signal to produce an RF stimulus signal. The RF stimulus signal includes a sequence of RF waveforms at a plurality of power levels, where each power level is associated with a respective DC voltage of the plurality of DC voltages. The RF stimulus signal is then sent to an input of the electronic device. The RF stimulus signal may be generated without involving an automatic level control (ALC) process. The modulating signal may further include reference waveforms operable to cause a known response pattern in an output signal of the electronic device. A transition time between two consecutive RF waveforms in the RF stimulus signal is less than 65 µs.

According to another embodiment of the present disclosure, an apparatus for testing an electronic device is described and comprises an RF generator, an AWG, and mixing logic. The RF generator is configured to output an RF carrier signal at a constant power level. The AWG is configured to output a power modulating signal comprising a sequence of DC waveforms at a plurality of DC voltages. The mixing logic is coupled to the RF generator and the AWG and configured to modulate the RF carrier signal using the power modulating signal to produce an RF stimulus signal. The RF stimulus signal comprises a sequence of RF waveforms at a plurality of power levels, where each power level is associated with a respective voltage of the plurality of DC voltages.

According to another embodiment of the present disclosure, an automatic testing system is shown and comprises: an AWG and a stimulus signal generator. The AWG is configured to output a power modulating signal comprising a sequence of direct current (DC) waveforms at a plurality of DC voltages. The stimulus signal generator is coupled to the AWG and comprises an RF source configured to generate an RF carrier signal at a constant power level; and mixing logic configured to modulate the RF carrier signal using the power modulating signal to produce an RF stimulus signal. The RF stimulus signal comprises a sequence of RF waveforms at a plurality of power levels, where each power level is associated with a respective voltage of the plurality of DC voltages.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed descrip

DETAILED DESCRIPTION

Figure 1:
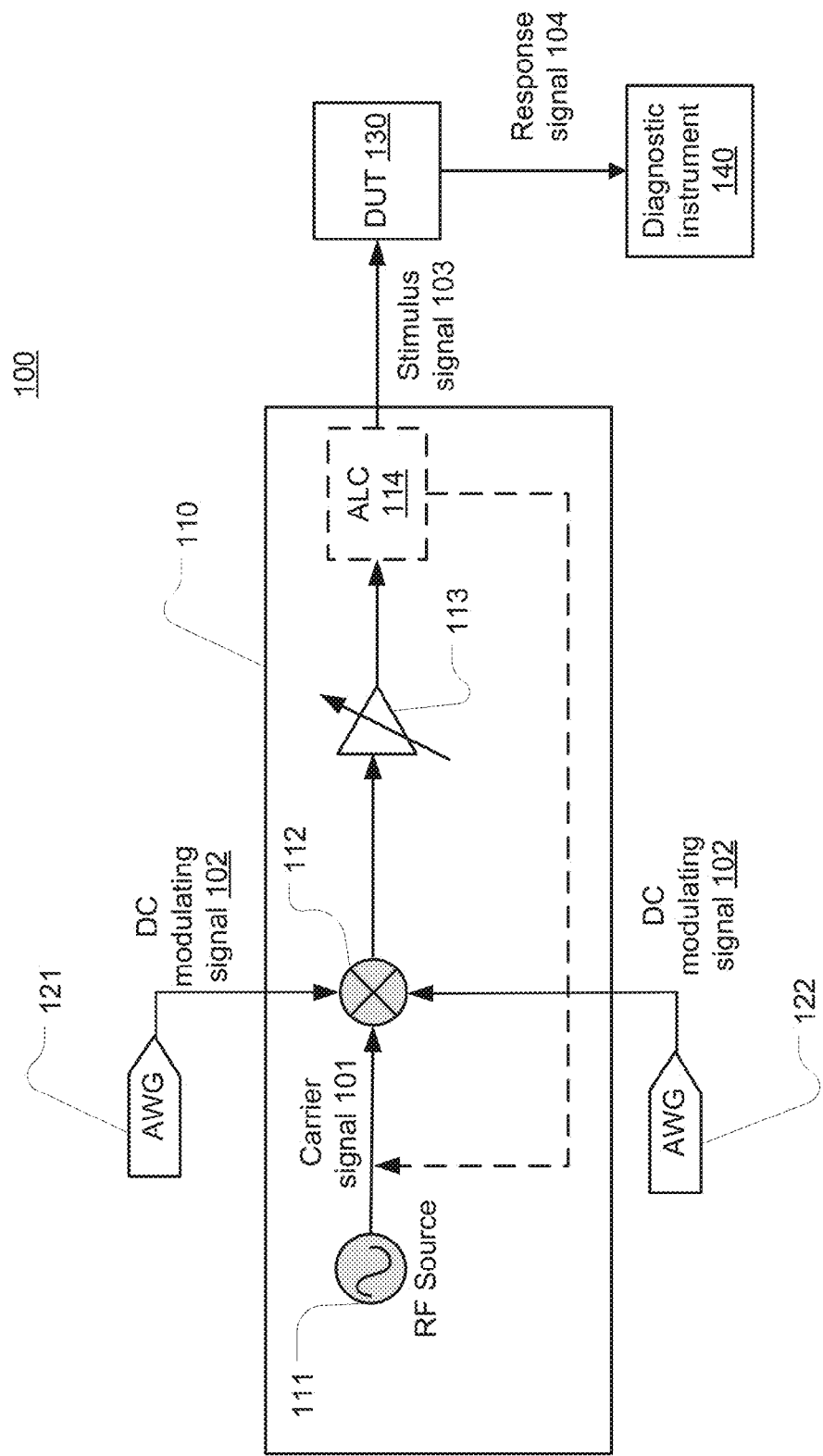
- FIG. 1 illustrates the configuration of an exemplary RF signal generator capable of generating a sequence of RF waveforms of varying power levels with minimal power transition times in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Generation of RF Stimulus Signal Using DC Modulating Signal

Overall, provided herein are systems and methods of generating a stimulus signal having a sequence of radio frequency (RF) waveforms for testing an electronic device. The stimulus signal is generated by using a sequence of direct current (DC) waveforms as a modulating signal to power modulate an RF carrier signal. A DC waveform transition in the modulating signal instantaneously triggers a corresponding RF waveform transition in the stimulus signal without involving an automatic level control feedback process.

FIG. 1 illustrates the configuration of an exemplary RF signal generator 110 capable of generating a sequence of RF waveforms 103 of varying power levels with minimal power transition times in accordance with an embodiment of the present disclosure. The sequence of RF waveforms 103 is provided to the input of the device under test (DUT) 130 as a stimulus signal. The DUT outputs the response signal 104 which is fed to a diagnostic instrument 140 for measurement. The measurement results are then analyzed and evaluated against expected values to verify the quality of the DUT or diagnose a fault therein.

The RF generator 110 includes an RF source 111 configured to output an RF carrier signal 101 at constant power and a mixer 112 operable to modulate the carrier signal 101 according to a modulating signal. The RF generator 110 is coupled to two external arbitrary waveform generators (AWGs) 121 and 122, each configured to generate a continuous modulating signal 102 composed of a sequence of DC waveforms. Each DC waveform in the signal 102 is set to a predetermined DC voltages level based on a set of desired RF power levels in the stimulus signal 103, as described in detail below. As a result, the mixer 112 yields the stimulus signal 103 composed of a sequence of RF waveforms at the desired power levels, where each RF power level in the stimulus signal 103 corresponds to a respective DC voltage level in the modulating signal 102.

Because the modulation process according to the present disclosure does not involve a feedback process (e.g., an automatic level control (ALC) process as used in the prior art), minimal settling time of a power transition in the stimulus signal can be advantageously achieved without introducing complex circuitry. More specifically, a transition of DC voltage level in the modulating signal 102 can instantaneously trigger a transition of RF power level in the stimulus signal 103.

As shown in FIG. 1, the RF generator 110 also includes a variable attenuator 113 and an ALC loop 114 as in some commercially available RF generators. However, the variable attenuator 113 and the ALC loop 114 are deactivated or bypassed during a course of power modulation according to the present disclosure, as shown by the dashed lines.

In the present example, the mixer 112 is configured for dual-channel modulation, namely the in-phase (I) modulation and the quadrature (Q) modulation. Accordingly, the outputs of AWGs 121 and 122 are respectively fed to the I-channel and the Q-channel in the mixer 112. However, any other suitable type of modulator or mixer can be used to produce an RF stimulus signal without departing the scope of the present disclosure. In some other embodiments, an intermediate frequency (IF) modulator can also be used to power modulate an RF carrier signal using DC waveforms and thereby produce an RF signal at a set of predetermined power levels.

Figure 2:
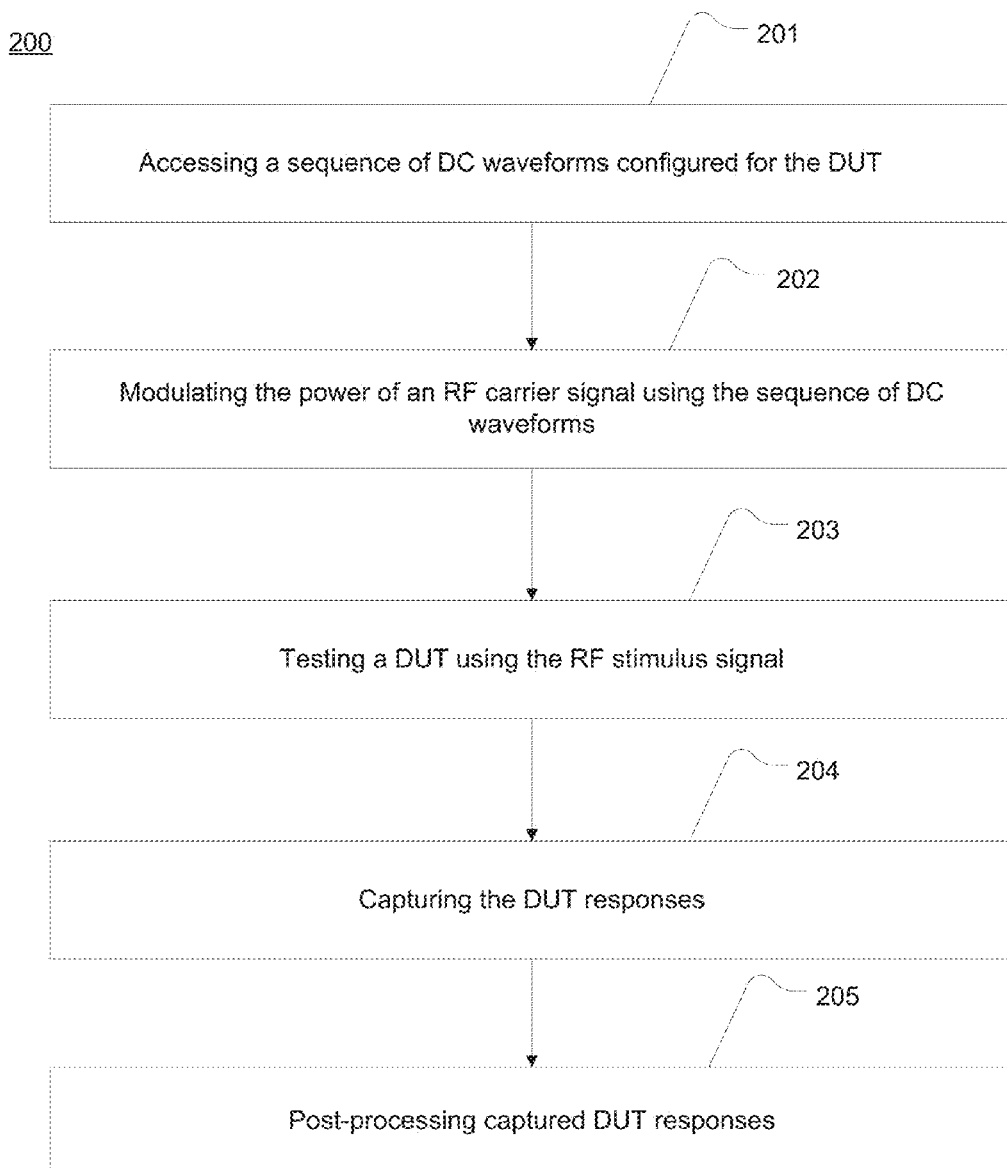
FIG. 2 is a flow chart illustrating an exemplary process of generating an RF stimulus signal to test a DUT in accordance with an embodiment of the present disclosure.
Figure 5:
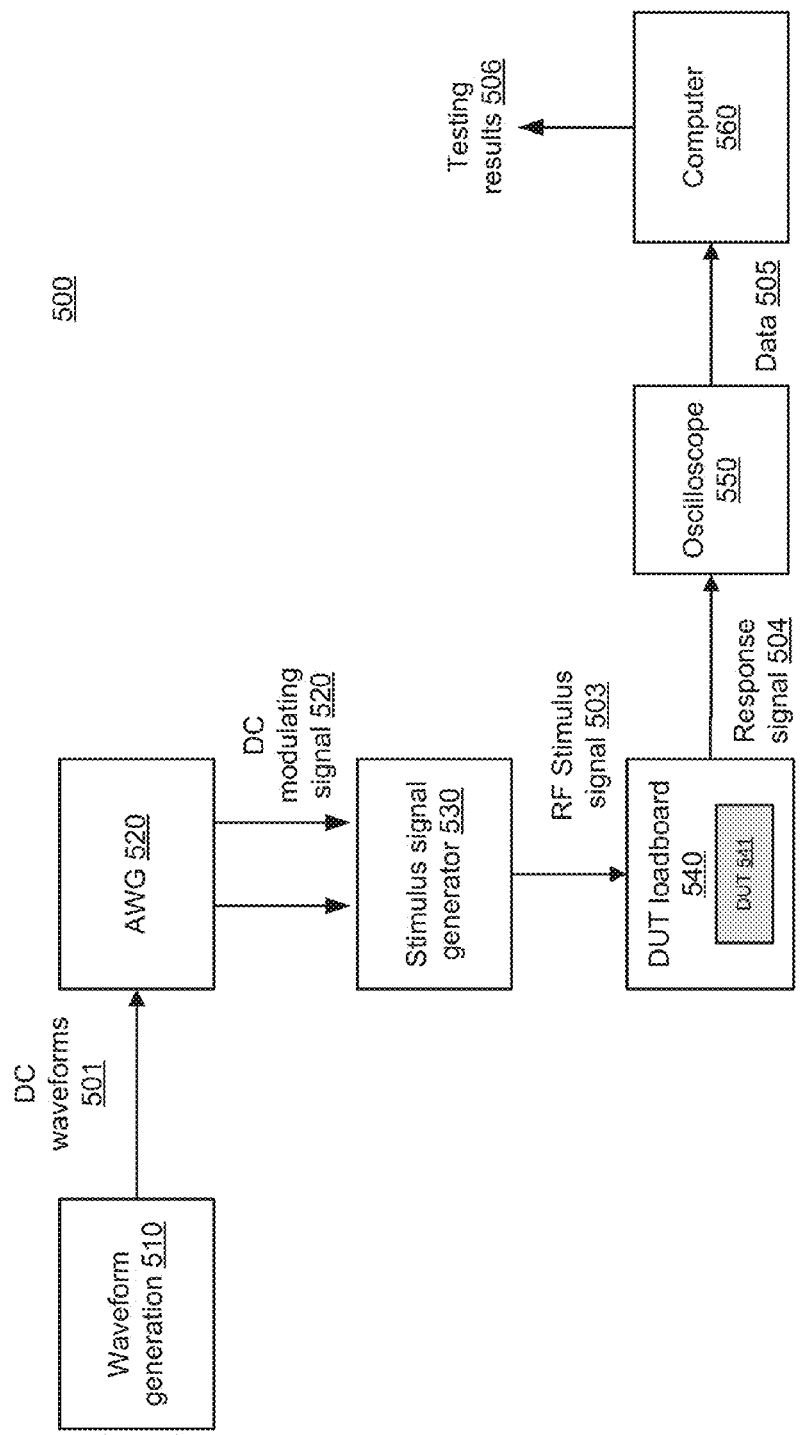
FIG. 5 is a block diagram illustrating the configuration of an exemplary ATE capable of generating a power modulated stimulus signal for testing a DUT in accordance with an embodiment of the present disclosure.

FIG. 2 is a flow chart illustrating an exemplary process 200 of generating an RF stimulus signal to test a DUT in accordance with an embodiment of the present disclosure. Process 200 can be performed by pertinent components of an automatic testing equipment (ATE), as shown in FIG. 5 for example. At 201, a sequence of DC waveforms that are configured for the present testing are generated, e.g., by an AWG or AWGs. In some embodiments, the DC waveform sequence is user-configured using a software program and preloaded in the AWG sequence memory.

At 202, an RF carrier signal with a fixed power is power modulated by the DC modulating signal composed of the DC waveforms, resulting in the RF stimulus signal having a plurality of power levels designed for the testing. According to embodiments of the present disclosure, by utilizing DC voltages to directly vary the power level of a carrier signal without using a feedback loop, the power modulation is performed in a fast approach offering the benefit of minimal transient times between output power transitions.

At 203, the RF stimulus signal is provided to an input of the DUT for testing. At 204, the DUT response signal is captured by a diagnostic instrument, e.g., an oscilloscope. At 205, the captured signal is processed online or offline to evaluate the electrical properties of the DUT.

Figure 3:
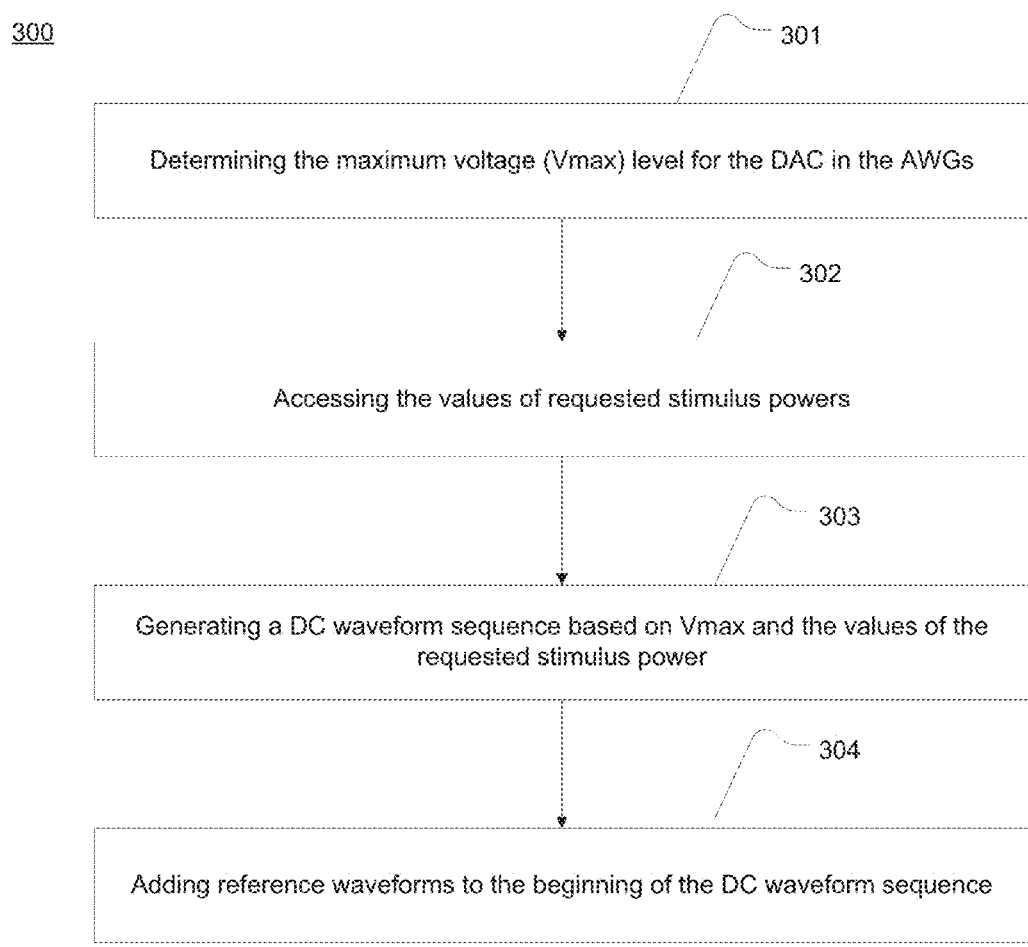
FIG. 3 is a flow chart depicting an exemplary process of determining a DC waveform sequence used to generate an RF stimulus signal of varying power levels in accordance with an embodiment of the present disclosure

FIG. 3 is a flow chart depicting an exemplary process 300 of determining a DC waveform sequence used to generate an RF stimulus signal of varying power levels in accordance with an embodiment of the present disclosure. The process 300 may be automatically performed by a computer based on user configurations and other input. In this example, the DC waveform sequence is designed for generating a DC modulating signal used in an IQ modulation process. The DC modulating signal is to be generated from each of two AWGs, one coupled to the I-channel and the other to the Q-channel.

At 301, to generate the corresponding DC waveform sequence, the maximum voltage level for the DACs (Vmax) is first determined to prevent over-driving and signal distortion. In some embodiments, Vmax is selected such that the combined IQ voltage matches the full scale voltage of a single DAC in the AWGs. For instance, assuming the full scale voltage of the DAC is equal to 1.25V, then the IQ voltage is represented as:

$IQ$ Voltage=SQRT($I^2+Q^2$), where $I$ represents $I$ voltage and $Q$ represents $Q$ voltage.

If I voltage is set to be equal to Q voltage, then $IQ$ Voltage=SQRT($2I^2$)=1.4142 $I$ voltage and $I=IQ$ Voltage/1.4142.

It shows that to achieve an IQ voltage of 1.25, the DC waveform maximum voltage should be set to 0.88V (=1.25V/1.4142), or the so-called "Reference Voltage." The corresponding waveform is called "Reference Power Waveform" hereinafter.

At 302 of FIG. 3, the values of requested stimulus powers are accessed. At 303, a DC waveform sequence is generated based on the Vmax and the values of the requested RF powers. A user needs to know up front what power levels of the stimulus signal to be achieved and the order thereof. For linearity tests it is common to progress from low to high, or high to low. However, it will be appreciated any other power sequence arrangement can be implemented without departing from the scope of the present disclosure. For instance, assuming the stimulus signal is designed to decrease from −20 dBm to −10 dBm in +1 dB increments. Thus, 11 DC waveforms should be generated with voltage levels that are computed by $Vdc$=Reference Voltage/pow(10.0,−Power Delta/20.0)

where "Power Delta" is equal to (Maximum Power−Requested Power). Table 1 shows the resultant DC waveform voltages (WF voltages) calculated according to the above equation.

TABLE 1

| Power Level | Power Delta | WF Voltage |
|---|---|---|
| −20 | −10 | 0.27950 |
| −19 | −9 | 0.31361 |
| −18 | −8 | 0.35188 |
| −17 | −7 | 0.39481 |
| −16 | −6 | 0.44299 |
| −15 | −5 | 0.49704 |
| −14 | −4 | 0.55769 |
| −13 | −3 | 0.62574 |
| −12 | −2 | 0.70209 |
| −11 | −1 | 0.78776 |
| −10 | 0 | 0.88388 |

In some other embodiments, other suitable types of modulators (e.g., IF modulators) can also be used to power modulate the carrier signal using DC waveforms. It will be appreciated that a process to determine a WF voltage sequence is specific to the associated modulation process and modulator configuration, and may be determined in a different process than the process described in detail above.

According to the calculated result, a waveform sequence can be generated in any suitable technique that is well known in the art. Because a typical AWG will continue to output the last DAC value in the sequence at the end of the sequence, the waveforms can be made relatively short to conserve the AWG memory. The waveform sequence is triggered out at a fixed interval depending on how much data to be captured for each power level and the sampler rate of the digitizer. For instance, 32 samples are taken for each waveform at a particular voltage level, and the power step interval is equal to 50 μs.

On the capture side, the output of a DUT is measured at all power levels in a single long capture and then post-processed to extract the sections that corresponds to the expected power level. Due to the large quantity of data, it can be difficult to identify a power transition point especially if the DUT is in compression. For example, if the DUT is in compression, a 1 dB change in the stimulus power may translate to a meager 0.1 db change in the output power. To ensure the power levels are correctly extracted out of the captured data, a calibration process can be performed.

As noted in 304 of FIG. 3, a set of reference waveforms are added to the beginning of the DC waveform sequence. The reference waveforms are expected to induce a known response pattern at the output of a DUT and thus can be inserted in the DC waveform sequence for calibration purposes. The present disclosure is not limited to any specific reference waveform or waveform sets.

Figure 4:
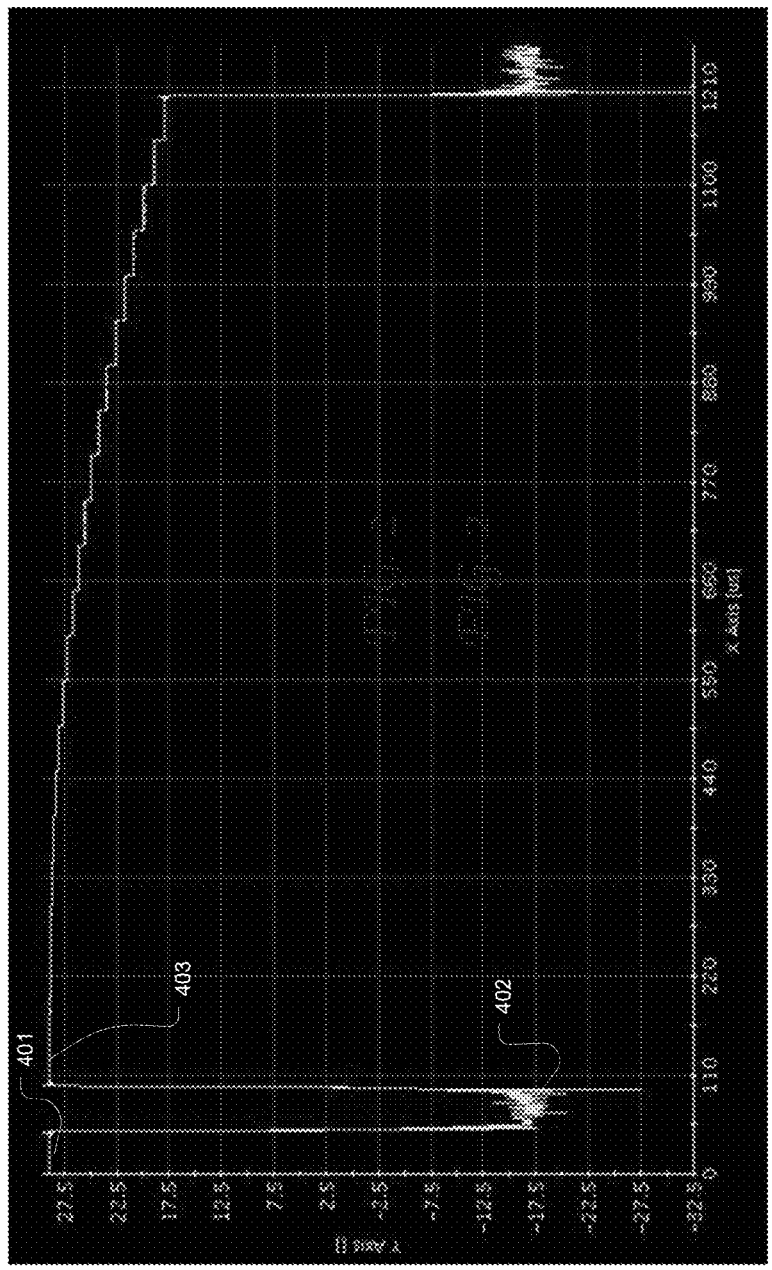
FIG. 4 is a sample output power vs. time plot of a power amplifier under test in response to a stimulus signal generated in accordance with an embodiment of the present disclosure.

In one embodiment, when generating the DC waveform sequence, the first three waveforms constitute a set of reference waveforms and set forth in the order of Reference Power Waveform
Vdd=0
Reference Power Waveform.
This assumes the test starts with the Reference Power Waveform. FIG. 4 is a sample output power vs. time plot of a power amplifier under test in response to a stimulus signal generated in accordance with an embodiment of the present disclosure. FIG. 4 shows the power amplifier is in compression under the testing condition.

The calibration process traverses the captured data array looking for a drop in power that is greater than 10 dB, which is an expected DUT response occurs at the transition between the first two waveforms (between 401 and 402 in FIG. 4). From there, a running average is calculated to mitigate the effects of the noise floor. When a sample is encountered to be greater than 10 dB above the running average, then this point is marked as the start of the second reference waveform (between 402 and 403 in FIG. 4).

The number of samples for each power level can be computed with the equation:

Samples Per Power Step=Digitizer Sample Rate×Power Step Interval

If the Digitizer Sample Rate=10 M Samples/s, then the Samples Per Power Step=500. The first power level data would be located 500 samples from the start of the second reference waveform.

In FIG. 4, the input power goes from 0 dBm down to −20 dBm in −1 dB steps, as shown in Table 1 Column "Power Level." The first few power steps are virtually indiscernible even though the input power drops by 1 dB per step. Using the calibration process described above, the power steps can be located in the capture data. The x-axis in FIG. 4 has units of μs. It shows that measuring 20 power levels can be completed in 1.3 ms (excluding ATE overhead), which is dramatically less than the 20.4 ms as required by using a modulation process according to the prior art. According to the prior art, the time it takes to change an RF signal in power or frequency (or the transition time) is around 1 ms. In contrast, according to the present disclosure, the transition time is less than 65 μs (=1.3 ms/20).

FIG. 5 is a block diagram illustrating the configuration of an exemplary ATE 500 capable of generating a power modulated stimulus signal for testing a DUT in accordance with an embodiment of the present disclosure. The ATE 500 includes a waveform generator component 510, an AWG 520, a stimulus signal generator 530, a loadboard 540, an oscilloscope, and a computer 560. In some embodiments, the AWG is an integral part of the signal generator 530. While in other embodiments, the AWG is an external unit to the signal generator 530.

The waveform generation component 510 may be a general purpose computer installed with a waveform generator program. A user can configure the program based on a desired stimulus signal so as to obtain a corresponding DC waveform sequence 501, as described in greater detail above. The DC waveform sequence 501 is loaded to the memory of the AWG 520 to generate the DC modulating signal 502. The stimulus signal generator 530 generates an RF carrier signal at a fixed power and modulates the RF carrier signal using the DC modulating signal 502. As described above, the power modulation process involves no ALC loop or other signal feedback process. The resultant RF stimulus signal 503 includes RF waveforms of various power levels corresponding to the various voltage levels defined by the DC waveforms 501.

The DUT may be an RF power amplifier. The RF stimulus signal 503 may be used to test its compliance with one or more industry standards, e.g., Bluetooth™, Global System for Mobile Communications (GSM™), Code-Division Multiple Access (CDMA), wide-band CDMA (WCDMA), etc.

The DUT loadboard 540 serves a mechanical and electrical interface between the ATE 500 and a DUT 541. The RF stimulus signal 503 is provided to the input of the DUT 541 through an adaptor (not explicitly shown) in the loadboard 540. The response signal 504 (or the output of the DUT 541) is provided from another adaptor (not explicitly shown) in the loadboard 540 to the oscilloscope 550. The oscilloscope 550 outputs the raw measurement data 505 regarding the response signal 504, e.g., voltages, powers, frequencies, currents, etc. However, the present disclosure is not limited by the diagnostic instrument used to measure response signals.

The data 505 is fed to the computer 560 installed with a data processing program for post-processing, such as data extracting, analyzing, computing, evaluating, etc. The data processing program generates testing results 506 and presents them to users in a suitable form, either in real-time or offline. It will be appreciated that an ATE according to the present disclosure may include a variety of other functions and components that are well known in the art.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of testing an electronic device, said method comprising:
    generating a modulating signal comprising: a sequence of direct current (DC) waveforms at a plurality of DC voltages; and a reference waveform operable to cause a known response pattern in an output signal of said electronic device;
    generating a carrier signal at a constant power level comprising a radio frequency (RF) waveform;
    power modulating said carrier signal using said modulating signal to produce an RF stimulus signal comprising a sequence of RF waveforms at a plurality of power levels, wherein each power level is associated with a respective DC voltage of said plurality of DC voltages; and
    sending said RF stimulus signal to an input of said electronic device.

2. The method of claim 1, wherein said sequence of DC waveforms is determined by:
    accessing a reference voltage value;
    accessing values of said plurality of power levels defined for testing said electronic device; and
    deriving values of said plurality of DC voltages according to said values of said plurality of power levels, wherein a maximum value of said plurality of DC voltages equals said reference voltage value.

3. The method of claim 1, wherein said modulating signal comprises two reference waveforms corresponding to two DC voltage values, and wherein said two reference waveforms precede said sequence of DC waveforms.

4. The method of claim 1 further comprising:
collecting said output signal of said electronic device in response to said RF stimulus signal; and
identifying a start of said output signal based on said known response pattern.

5. The method of claim 1, wherein said RF stimulus signal is generated without involving an automatic level control (ALC) process.

6. The method of claim 1, wherein said electronic device comprises an amplifier, and wherein said RF stimulus signal is used to test linearity of said amplifier.

7. The method of claim 1, wherein said power modulating comprises supplying said modulating signal to an I-channel modulator and a Q-channel modulator, respectively.

8. The method of claim 1, wherein a transition time between two consecutive RF waveforms in said RF stimulus signal is less than 65 μs.

9. An apparatus for testing an electronic device, said apparatus comprising:
an RF generator configured to output an RF carrier signal at a constant power level;
an arbitrary waveform generator (AWG) configured to output a power modulating signal comprising: a sequence of direct current (DC) waveforms at a plurality of DC voltages; and a reference waveform operable to cause a known response pattern in an output signal of said electronic device; and
mixing logic coupled to said RF generator and said AWG and configured to modulate said RF carrier signal using said power modulating signal to produce an RF stimulus signal, wherein said RF stimulus signal comprises a sequence of RF waveforms at a plurality of power levels, wherein each power level is associated with a respective voltage of said plurality of DC voltages.

10. The apparatus of claim 9, wherein said mixing logic comprises an in-phase/quadrature (I/Q) modulator, and wherein said sequence of DC waveforms are provided to an I-channel and a Q-channel of said I/Q modulator, respectively.

11. The apparatus of claim 9, wherein said mixing logic comprises an intermediate frequency (IF) modulator.

12. The apparatus of claim 9, wherein said sequence of DC waveforms is determined by:
accessing a reference voltage value;
accessing values of said plurality of power levels defined for testing said electronic device; and
deriving values of said plurality of DC voltages according to said values of said plurality of power levels, wherein a maximum value of said plurality of DC voltages equals said reference voltage value.

13. The apparatus of claim 9 further comprising an automatic level control (ALC) loop logic, wherein said ALC loop logic is deactivated during said mixing logic producing said RF stimulus signal.

14. The apparatus of claim 9, wherein said power modulating signal further comprises two reference waveforms preceding said sequence of DC waveforms, and wherein said two reference waveforms correspond to two DC voltages.

15. The apparatus of claim 9, wherein said mixing logic is configured to produce said RF stimulus signal with a transition time between two consecutive power levels being less than 65 μs, and wherein said RF stimulus signal is used to test gain and linearity of an integrated circuit (IC) amplifier.

16. An automatic testing system comprising:
an arbitrary waveform generator (AWG) configured to output a power modulating signal comprising: a sequence of direct current (DC) waveforms at a plurality of DC voltages; and a reference waveform operable to cause a known response pattern in an output signal of said electronic device;
a stimulus signal generator coupled to said AWG and comprising:
an RF source configured to generate an RF carrier signal at a constant power level; and
mixing logic coupled to said RF generator and said AWG and configured to modulate said RF carrier signal using said power modulating signal to produce an RF stimulus signal, wherein said RF stimulus signal comprises a sequence of RF waveforms at a plurality of power levels, wherein each power level is associated with a respective voltage of said plurality of DC voltages.

17. The automatic testing system of claim 16 further comprising:
an adaptor configured to couple an input of a device under test (DUT) to said stimulus signal generator; and
a diagnostic device coupled to said adaptor and configured to collect an output signal of said DUT.

18. The automatic testing system of claim 16, wherein said mixing logic comprises an in-phase/quadrature (I/Q) modulator, and wherein said sequence of DC waveforms are provided to an I-channel and a Q-channel of said I/Q modulator, respectively.

19. The automatic testing system of claim 16, wherein said sequence of DC waveforms is determined by:
accessing a reference DC voltage value;
accessing values of said plurality of power levels defined for testing said electronic device; and
deriving values of said plurality of DC voltages according to said values of said plurality of powers, wherein a maximum value of said plurality of DC voltages equals to said reference DC voltage value.

20. The automatic testing system of claim 16, wherein said stimulus signal generator further comprises an automatic level control (ALC) loop logic, wherein said ALC loop logic is deactivated during said mixing logic producing said RF stimulus signal, and wherein further said mixing logic is configured to produce said RF stimulus signal with a transition time between two consecutive power levels less than 65 μs.

* * * * *